United States Patent [19]

Cargle et al.

[11] 4,425,252

[45] Jan. 10, 1984

[54] METHOD FOR RESPIRATORY COAL DUST ABATEMENT

[75] Inventors: Virgil H. Cargle, Houston; Wilbur L. Bridges, Shepherd, both of Tex.

[73] Assignee: Exxon Research & Engineering Co., Florham Park, N.J.

[21] Appl. No.: 322,921

[22] Filed: Nov. 19, 1981

[51] Int. Cl.³ .............................................. C09K 3/22
[52] U.S. Cl. ...................................... 252/88; 252/553
[58] Field of Search .................................. 252/88, 553

[56] References Cited

U.S. PATENT DOCUMENTS

| | | | |
|---|---|---|---|
| 2,489,955 | 11/1949 | Colgate et al. | 252/161 |
| 2,900,346 | 8/1959 | Fowkes et al. | 252/161 |
| 3,900,611 | 8/1975 | Corbett et al. | 427/214 |
| 4,067,818 | 1/1978 | Marin | 252/88 |
| 4,213,873 | 7/1980 | Church | 252/174.21 |
| 4,235,758 | 11/1980 | Dawson et al. | 252/544 |

OTHER PUBLICATIONS

McCutcheon's Detergents & Emulsifiers, North American Edition, 1980 Annual.
J. O. Glanville et al., Fuel, vol. 58, pp. 819–822 (1976).
P. L. Walker, Jr., et al., I&E CH, 2389–2393, Oct. 1952.

*Primary Examiner*—John E. Kittle
*Assistant Examiner*—Robert A. Wax
*Attorney, Agent, or Firm*—Roland A. Dexter

[57] ABSTRACT

Abatement of respiratory coal dust is facilitated by water spraying the dusty area with a system having at least about 50 ppm of the combination of a water soluble sulfonic acid salt and a nonionic surfactant having an HLB ranging from 12 to 14.

7 Claims, No Drawings

METHOD FOR RESPIRATORY COAL DUST ABATEMENT

The present invention relates to improvements in or relating to the abatement of respiratory coal dust especially in coal mines and is particularly concerned with aqueous formulations that may be sprayed on to the coal seam face being mined so as to readily wet the coal dust adjacent thereto resulting in its rapid removal from the air.

BACKGROUND OF THE INVENTION

It is known to lay dust in coal mines by spraying with aqueous systems containing chemical additives to improve working conditions and reduce the toxicological risks and explosion hazards. Most commonly used chemicals for for this purpose are hydroscopic salt mixtures. It has been proposed that the dust may be layed by spraying the dusty areas with water containing surfactants. United Kingdom Pat. No. 677279 describes the use of aqueous systems containing alkyl benzene sulphonates in which the alkyl group contains from 10 to 12 carbon atoms while U.S. Pat. No. 4,067,818 teaches those in which the alkyl group contains 9 carbon atoms. U.S. Pat. No. 3,900,611 utilizes the combination of an amphoteric surfactant with an anionic surfactant (sulfosuccinate) in an aqueous solution of a polymer such as polyacrylamide.

Sulfosuccinates are taught to have activity in coal dust abatement (see J. O. Glanville et al, Fuel, Vol. 58, pp 819–22 (1976) and P. L. Walker Jr., et al I&I Ch, 2389–2393 October, 1952) and the former citation compares its activity with the activity of a non-ionic surfactant, polyethoxylated octyl phenol.

The wetting power is a measure of the extent to which the dust-laying composition spreads over the surface of the dusty area, (i.e., the coal) thus increasing the extent to which the dust is laid. The greater the wetting power of the composition, the greater the dust laying effect for the same amount of composition which is of course economically important. Thus, by using surfactants with a greater wetting effect it is possible to achieve the same power from a composition containing less surfactant which is also economically and environmentally important.

SUMMARY OF THE INVENTION

It has been discovered that the combination of an anionic surfactant, preferably sodium dodecylbenzene sulfonate, and a nonionic surfactant, preferably polyethoxylated nonylphenol, provides an aqueous formulation for the rapid abatement of respiratory coal dust.

Thus, in accordance with this invention there is provided a method for the abatement of respiratory coal dust comprising spraying the coal dusty area with a formulation comprising water containing up to 0.1% by weight of the mixture of an anionic surfactant, i.e. a water soluble salt of an alkyl aryl sulfonic acid and a nonionic surfactant having an HLB of from 10 to 16. Optimally, the mixture of this invention contains one or more cosolvents generally of the class of alkylene glycol monoalkyl ethers, $C_2$ to $C_5$ alkanols and mixtures thereof.

In preferred form this invention provides a process for the abatement of air-borne dust, usually coal dust, comprising spraying the dusty area with a formulation comprising water containing up to 0.1% by weight of a wetting combination of the salt of an alkyl benzene sulfonic acid in which the alkyl group contains from 8 to 13, most usefully about 12, carbon atoms and a nonionic surfactant having an HLB ranging from 12 to 14.

DETAILED DESCRIPTION OF THE INVENTION

As set forth above the invention is embodied in a formulation for the abatement of respiratory coal dust which comprises water containing a minor but at least coal dust wetting combination comprising (a) 1 to 9 parts by weight of a water soluble salt of an alkyl aryl sulfonic acid of the general formula $(R)_n\text{—}A_r\text{—}SO_3M$ wherein $(R)_n$ represents 1 to 5 alkyl groups which may be the same or different and at least one alkyl group containing from 8 to 16 carbon atoms, n is an integer of from 1 to 5, $A_r$ represents an aryl group which may be further substituted and M is an organic or inorganic cation; and, (b) 1 to 9 parts by weight of a nonionic surfactant having an HLB of 10 to 16. HLB, refers to the so-called Atlas HLB System which is described in the publication entitled, THE ATLAS HLB SYSTEM, 4th Printing, Published by Atlas Chemical Industries, 1963. M may be an alkali metal such as sodium or potassium or a nitrogenous base such as a quaternary ammonium or quaternary amino which may for preference be ethoxylated.

The anionic surfactant is preferably an alkyl benzene sulfonic acid salt wherein the alkyl group contains 8 to 16, more usefully 10 to 14, optimally about 12 carbon atoms. Representative of the preferred anionic surfactants is the sodium salt of dodecyl benzene sulfonic acid.

The nonionic surfactant as previously indicated should have an HLB between 10 and 16. Preferably, it has an HLB between the range of 12 and 14 with 13 being the most preferred.

The preferred nonionic wetting agents of the combination of the invention are within the middle of the HLB scale and, therefore, they tend to have both hydrophilic and hydrophobic properties. A preferred nonionic surfactant is nonylphenol which has been reacted with 10 moles of ethylene oxide.

The weight ratio of the coal dust wetting combination of sulfonic acid to nonionic surfactant generally is within the range of 1:9 to 9:1. Preferably the range is 2:4 to 4:2, and most preferably 1:1. The combination is effective in from 50 to 2000 ppm concentration in water. Generally, a minor but effective amount is at least 50 ppm.

For reasons not fully appreciated the wetting of the air-borne coal dust particles which appear in size less than 200 mesh is enhanced by from 2 to 20 weight parts of a cosolvent per weight part of the coal dust wetting composition of the invention. Thus it is preferable to have the coal dust wetting combination dissolved in water containing from 2 to 20 weight percent of a cosolvent of the class of alkylene glycol monoalkyl ethers, $C_2$ to $C_5$ alkanols and mixtures thereof. In some applications it is desirable to have from 0.1 to 1 weight percent of a calcium ion present.

Representative ether co-solvents are ethylene glycol monoethyl ether, ethylene glycol monomethyl ether, ethylene glycol monobutyl ether, diethylene glycol monomethyl ether, diethylene glycol monoethyl ether, diethylene glycol n-butyl ether, propylene glycol monomethyl ether, dipropylene glycol monomethyl ether and tripropylene glycol monomethyl ether. The alkanol co-solvents include straight and branched chain members such as ethanol, propanol, butanol, and pentanol. Isopropyl alcohol is preferred. Water is always the major component and primary solvent of the formulations of the invention.

The following preparations and examples are included herein as further description and illustrative of the present invention.

EXAMPLE 1

A concentrate having excellent wetting activity on airborne coal dust when contained in sprayed water at 400 ppm concentration has the composition:

| Component | Weight % |
| --- | --- |
| Sodium Dodecylbenzene Sulphonic Acid Salt | 13.9 |
| Nonylphenol plus 10 moles ethylene oxide | 13.9 |
| Isopropyl Alcohol | 3.5 |
| Diethylene Glycol Monobutylether | 11.0 |
| Water | 57.7 |

EXAMPLE 2

To evaluate the wetting activity on coal dust, several formulations were subjected the following test.

Coal Dust Wetting Test

Test solutions containing 400 ppm and 40 ppm $Ca^{++}$ (as calcium nitrate) were prepared in distilled water. 250 ml of each test solution were placed in a 500 ml beaker. 0.050 g of <200 mesh coal dust was added to the surface of each solution. The time taken for the last trace of coal dust to break through the surface of the solution was measured with a stop watch. This was reported as the wetting time. Each test solution was run at least six times.

The enhanced coal dust wetting activity of the formulation of the invention is seen from the data of the following table where it is compared with the activity of its primary components by utilizing the foregoing test procedure.

| | Formulation (a) | | |
| --- | --- | --- | --- |
| Test | Wt. Parts of Surfactants | | Wetting Time |
| No. | Sulfonic Acid Salt[1] | Nonylphenol (ETO)$_{10}$[2] | (Min.) |
| 1 | 10 | 0 | 6.1 |
| 2 | 7.5 | 2.5 | 5.8 |
| 3 | 5. | 5. | 3.9 |
| 4 | 2.5 | 7.5 | 4.0 |
| 5 | 0 | 10 | 53.0 |

(a) The components were dissolved in water containing 40 ppm of $Ca^{++}$ to provide a concentration level of 400 ppm.
[1]The sodium salt of dodecyl benzene sulfonic acid.
[2]Nonylphenol reacted with 10 moles of ethylene oxide.

The results shown in the Table of Example 2 demonstrate the unexpected synergistic properties of mixtures containing alkyaryl sulfonic acid salts and the ethoxylate of an alkyl phenol. In this tabulation, the mixtures are varied to provide different ratios of the dodecyl benzene sulfonic acid sodium salt and the nonylphenol ethoxylated with 10 moles of ethylene oxide and the wetting time for the coal is measured for each mixture.

The invention in its broader aspect is not limited to the specific details shown and described and departures may be made from such details without departing from the principles of the invention and without sacrificing its chief advantages.

What is claimed is:

1. A formulation for the abatement of respiratory coal dust comprising water containing from 50 to 2,000 parts per million concentration of a coal dust wetting combination comprising: (a) 10 to 90 parts by weight of a water soluble salt of dodecyl benzene sulfonic acid; and, (b) 90 to 10 parts by weight of a nonionic surfactant which is a polyethoxylated $C_8$ to $C_{10}$ alkyl phenol containing from 6 to 14 moles of ethylene oxide.

2. A formulation according to claim 1 wherein said nonionic surfactant is nonyl phenol reacted with 10 moles of ethylene oxide and the weight ratio of said sulfonic acid to said nonionic surfactant is from 2:4 to 4:2.

3. A formulation according to claim 2 wherein the cation of the salt is sodium.

4. A formulation according to claim 3 wherein said weight ratio is 1:1.

5. A formulation according to claim 1 wherein there is also from 2 to 20 parts by weight of a cosolvent of the class of alkylene glycol monoalkyl ethers, $C_2$ to $C_5$ alkanols and mixtures thereof.

6. A process for the abatement of respiratory coal dust comprising spraying the dusty area with a formulation according to claim 1.

7. An aqueous concentrate comprising from about 25 to 75 weight percent of a coal dust wetting combination consisting essentially of from 10 to 90 parts by weight of a water soluble salt of dodecyl benzene sulfonic acid and 90 to 10 parts by weight of a nonionic surfactant having an HLB ranging from 12 to 14, said nonionic surfactant being a polyethoxylated $C_8$ to $C_{10}$ alkyl phenol containing from 6 to 14 moles of ethylene oxide.

* * * * *